United States Patent [19]

Irribarren

[11] Patent Number: 5,349,636
[45] Date of Patent: Sep. 20, 1994

[54] INTERFACE SYSTEM AND METHOD FOR INTERCONNECTING A VOICE MESSAGE SYSTEM AND AN INTERACTIVE VOICE RESPONSE SYSTEM

[75] Inventor: Roberto Irribarren, Fremont, Calif.

[73] Assignee: Centigram Communications Corporation, San Jose, Calif.

[21] Appl. No.: 101,342

[22] Filed: Aug. 2, 1993

Related U.S. Application Data

[63] Continuation of Ser. No. 783,686, Oct. 28, 1991, abandoned.

[51] Int. Cl.5 .................. H04M 1/64; H04M 11/00
[52] U.S. Cl. ........................... 379/89; 379/67; 379/88; 379/94; 379/100; 379/212
[58] Field of Search ............. 379/67, 88, 89, 94, 379/100, 212

[56] References Cited

U.S. PATENT DOCUMENTS

| | | | |
|---|---|---|---|
| 4,837,798 | 6/1989 | Cohen et al. | 379/396 |
| 4,916,726 | 4/1990 | Morley, Jr. et al. | 379/88 |
| 4,935,954 | 6/1990 | Thompson et al. | 379/94 |
| 4,972,462 | 11/1990 | Shibata | 379/89 |
| 4,996,704 | 2/1991 | Brunson | 379/100 |
| 5,146,488 | 9/1992 | Okada et al. | 379/89 |
| 5,193,110 | 3/1993 | Jones et al. | 379/88 |

Primary Examiner—James L. Dwyer
Assistant Examiner—Fan Tsang
Attorney, Agent, or Firm—Flehr, Hohbach, Test, Albritton & Herbert

[57] ABSTRACT

A communication system for verbal telephonic communication has a voice message system for storing and retrieving voice messages integrated with a computer database accessing system for storing and retrieving text messages from a separate computer system and for converting the text messages into voice. The systems are integrated via a network which coordinates the functions of each individual system. Additionally, the input/output ports of the voice message system and the computer database accessing system are connected in a parallel fashion to at least one telephone line. In this configuration a user may access both voice messages and database information, including text or electronic mail messages, with a single telephone call. Optionally, facsimile messages can be stored, retrieved and manipulated with a single telephone call.

7 Claims, 10 Drawing Sheets

INTERFACE SYSTEM AND METHOD FOR INTERCONNECTING A VOICE MESSAGE SYSTEM AND AN INTERACTIVE VOICE RESPONSE SYSTEM

This is a continuation, of application Ser. No. 07/783,686 filed Oct. 28, 1991 now abandoned.

The present invention relates generally to voice and text messaging systems and particularly to methods and systems for interconnecting voice message systems and interactive voice response systems.

BACKGROUND OF THE INVENTION

Figure 1:
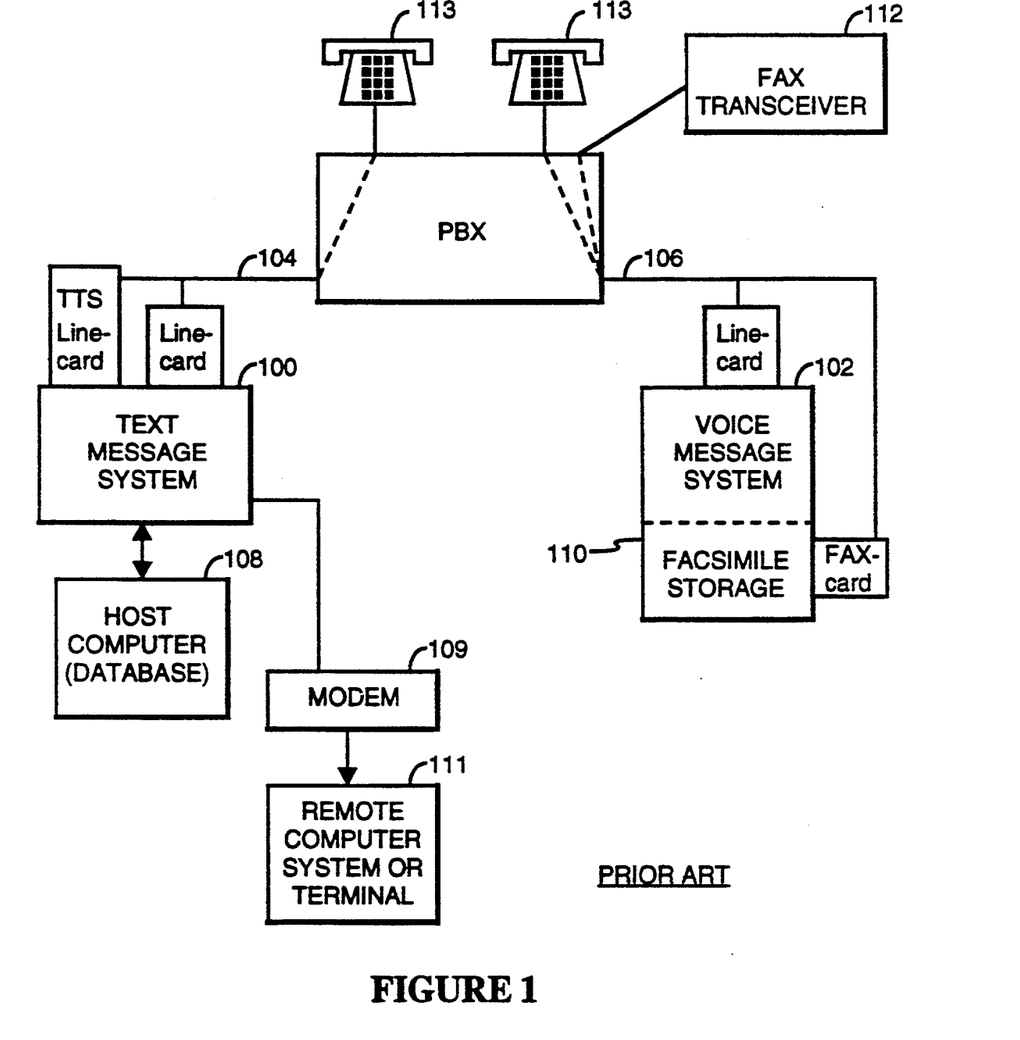
FIG. 1 is a block diagram of the prior art depicting the separate access required to interact with a voice message system and a text message system.

Typically, office communications are stored in two formats, voice messages and text messages. Recently, a third format, facsimile communication, has become prevalent in the business community. Generally, voice messages are stored and accessed via a dedicated voice mail system connected to a private branch exchange (PBX) or directly to the local telephone system. Text messages are usually stored and accessed on a computer system separate from the voice message system and are usually only accessible via another computer or terminal. Recent advances in text to speech (TTS) conversion systems have made it possible to access previously stored text messages via a telephone. However, these systems are usually dedicated to text message access and to retrieving other database information stored in text form within the computer system. As depicted in FIG. 1, each of the office communications systems must be separately accessed by a remote user.

Voice message systems, also known as voice mail systems, have become common modes of communication amongst business persons and consumers alike. Typically, a business organization will have a PBX direct a caller's telephone call to an appropriate extension within the organization. If the connection is not completed, the call is forwarded to a voice mail system wherein the caller may leave a voice message in a "mailbox" having an address corresponding to the extension called.

A commercially available system which provides the above basic messaging functions plus a number of optional functions such as automated dispatch, automated reception service, verbal bulletin boards, and paging is the VoiceMemo II ™ voice processing system. VoiceMemo II ™ is a trademark of Centigram Communications Corporation, San Jose, Calif. The stand alone VoiceMemo II ™ is capable of storing up to 960 hours of messages in support of up to 10,000 users utilizing up to 120 telephone lines.

Design of voice mail systems, as in the VoiceMemo II ™ system, incorporates one or more microprocessors to control call distribution, mailbox allocation, and user prompt upon playback. Typically, the voice messages are digitized and stored on one or more hard disk drives. A user subsequently may request the voice messages which the voice mail system has stored. Upon user request, the microprocessor will access the disk drive and have the digitized message or messages retrieved and converted into an analog signal which is then played to the user. The user may then command the system via the touchtone keypad of the telephone to delete the message, forward it to another mailbox, or save it.

Optionally, the VoiceMemo II ™ system can be integrated with a FAX card for receiving and transmitting facsimile transmissions. The system, known as FaxMemo ™, is capable of storing, retrieving and manipulating facsimile messages in much the same manner in which voice messages are handled. Using this arrangement, a user can call the VoiceMemo II ™ system and be notified that a facsimile addressed to the user has been received. The user may optionally save the FAX, delete it, print it to a default printer located near the user's office, or have the FAX sent to any FAX transceiver (machine) which the user designates by entering the transceiver's telephone number.

In addition to voice mail systems and FAX machines, many offices have electronic mail systems. Typically, a central computer system serves as the host to the electronic mail system and the users interface with the computer via terminals or a network of personal computers (PCs). Each user has a mailbox within the system. The users of the central computer may send messages amongst themselves by typing a message and addressing it to the mailbox address of another user. Users outside of the network that are not directly connected to the central computer may connect to the central computer via a modem. Thus, outsiders using other electronic mail systems may send messages to any known address within an organization's electronic mail system via the modem.

However, until recently, the electronic mail systems could only be accessed by a PC or terminal via direct connection or a modem. To overcome this access hinderance, text to speech (TTS) translators are used to enable a remote user to use a telephone to contact the electronic mail system and have previously stored messages "read" to the user over the telephone. Using the touchtone keypad, the user may optionally forward the message to another electronic mail address, delete the message, or save it. These systems are known in the art as interactive voice response (IVR) systems.

A commercially available IVR system which provides the foregoing basic features is the Voice Gateway System (VGS) ® produced by Centigram Communications Corporation, San Jose, Calif. VGS is a registered trademark of the manufacturer. In addition to the standard features of a text to speech system, VGS enables the user to respond to messages by sending previously stored text passages to the sender of the message via the electronic mail system to acknowledge receipt of the message. Also, the IVR system can be used to select and access database information other than electronic mail, such as catalog and sales information. The user may enter data into the selected database via the touchtone telephone keypad. For instance, the data entry capability is useful for sales persons to enter order information from remote locations. In this form, information residing in the database is accessed for read out as well as modified (written to) by the user's touchtone keypad input.

An office having both an electronic mail system with a TTS translator, i.e., an IVR system, and a voice mail system forces the users to remember a number of separate commands and access codes for each system. In addition, separate phone calls must be placed or call transfer used to access each system. A cumbersome task to say the least.

It is therefore a primary objective of the present invention to provide a system and method of integrating voice mail systems and IVR systems such that a single call can be placed to access information stored in both systems.

Another objective is to enable a single instruction set to be used to retrieve and manipulate voice and text messages within a comprehensive voice mail/electronic mail system.

SUMMARY OF THE INVENTION

In summary, the present invention is a communication system for verbal telephonic communication comprising a voice message system for storing and retrieving voice messages integrated with a computer database accessing system for storing and retrieving text messages from a separate computer system and for converting the text messages into voice messages. The systems are integrated via a network which coordinates the functions of each individual system. Additionally, the input/output ports of the voice message system and the computer database accessing system are connected in a parallel fashion to a single telephone line. In this configuration a user may access both voice messages and database information (including text messages) with a single telephone call.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Referring to FIG. 1, there is shown a block diagram of a prior art office communications system. Shown are a text message system 100, e.g., an IVR system, being distinctly separate from a voice message system 102, e.g., a voice mail system. Each system is accessed via different telephone lines 104, 106 and require the user to make two calls to access information stored within each system or to use a call transfer feature of the PBX to transfer the user's call from one system to the other. In a PBX, the transfer feature is known in the art as a flash hook transfer.

Generally, the text message system 100 provides access to a separate host computer 108 wherein the electronic mail or other database information is stored. The text message system 100 is, in general, a means to facilitate computer database access and should not be construed to be limited to text access alone. The database may store text messages as in an electronic mail system or it may store sales or other data.

In operation, the user calls the system 100, logs in via a user number and password, and is prompted to use the touchtone keypad to command the system 100 to accomplish specific functions. Initially the user will be told by the system 100 how many text messages are addressed to the previously entered user number and how many of those have not been played previously. By touchtone command the user may request a message or messages be played via the text to speech translation subsystem. Replies to the messages are accomplished by requesting the system to send previously stored or "canned" messages to the sender's electronic mail address. These pre-stored messages are typically very simple acknowledgements such as "message received", "message received, I'll get back to you when I return to the office", etc.

Typically, the text message system 100 will be connected to one or more host computers 108 directly, but a modem 109 can also be used to permit the user to connect to remote computers 111 to read electronic mail or access databases stored therein. This arrangement provides the user with great flexibility in manipulating database information in a variety of locations via a telephone.

The apparatus and process of accessing the databases of a host computer via a telephone is old in the art. A representative patent of such a system is U.S. Pat. No. 4,716,583, entitled VERBAL COMPUTER TERMINAL SYSTEM, issued to Groner et al. on Dec. 29, 1987 and assigned to Centigram Communications Corporation of San Jose, Calif. To provide telephone access to computer information, text to speech subsystems have become prevalent. A representative text to speech apparatus patent is U.S. Pat. No. 4,979,216, entitled TEXT TO SPEECH SYNTHESIS SYSTEM AND METHOD USING CONTEXT DEPENDENT VOWEL ALLOPHONES, issued to Malsheen et al. on Dec. 18, 1990. Each of these patents are incorporated herein by reference.

In addition to the text message system 100, office communications systems typically include a voice message system 102 as depicted in FIG. 1. These systems are accessible via telephone such that voice messages may be retrieved and manipulated via touchtone commands. A patent which is representative of voice message systems in general and herein incorporated by reference is U.S. Pat. No. 4,371,752, entitled ELECTRONIC AUDIO COMMUNICATION SYSTEM issued to Mathews et al. on Feb. 1, 1983.

In addition to the standard voice message systems 102 which enable callers to record messages which are subsequently replayed, forwarded, or deleted by the user via a telephone 113, recent developments have enabled facsimile (FAX) messages to be stored as image files within the voice message system storage, i.e. disc drive, represented by reference numeral 110 in FIG. 1. These FAX messages may be manipulated in the same manner as the voice messages. The user, upon the system instructing him or her that a FAX has been received, may forward the FAX to any number to which a FAX transceiver in the form of a FAX machine or other FAX receiving system is attached, forward the FAX image file to another voice mail address, have a hard copy printed on the office FAX machine 112, or delete the FAX. These basic functions and more are available in the FaxMemo system manufactured by Centigram Communications Corporation of San Jose, Calif.

Figure 2:
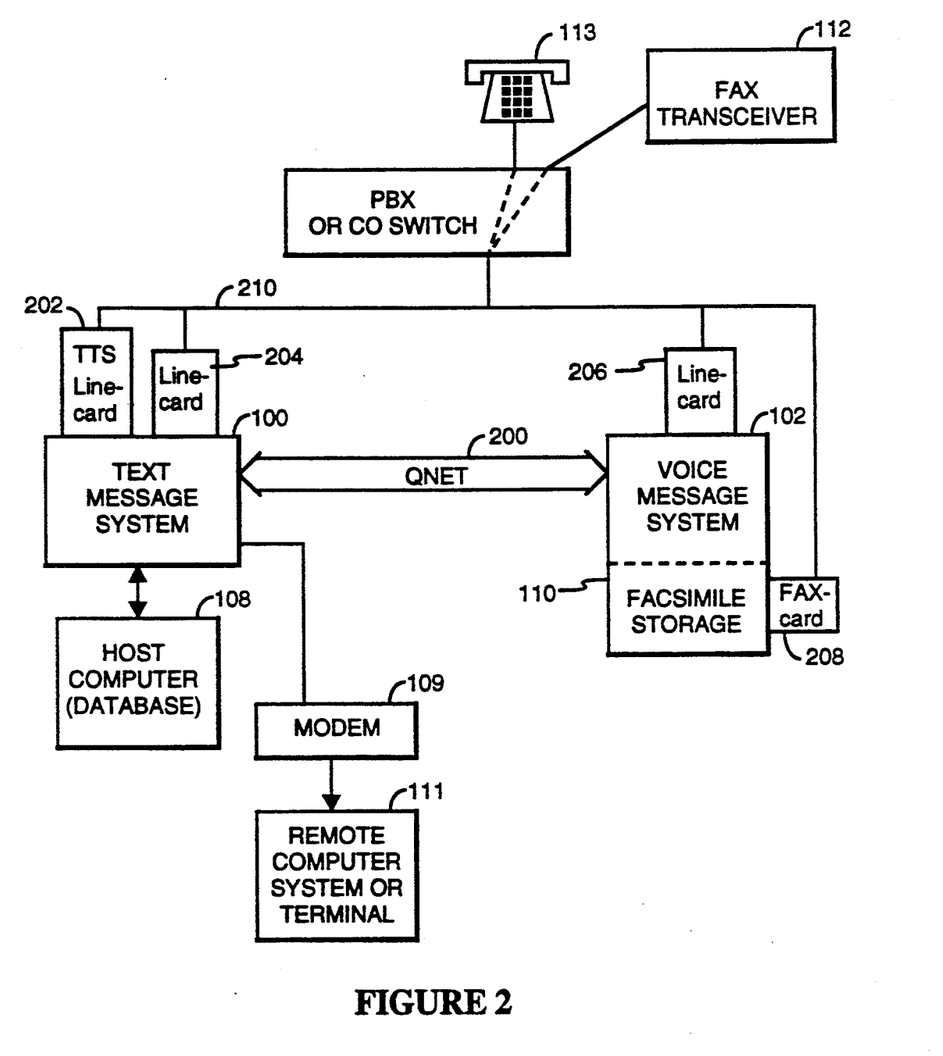
FIG. 2 is a block diagram of the preferred embodiment of the invention.

Referring to FIG. 2 depicting the preferred embodiment of the invention, a network 200 is disposed between a computer database accessing means for storing and retrieving text messages and a voice message means for storing and retrieving voice messages (voice message system 102) Interface apparatus 202, 204, 206, 208 for connecting each system to the telephone lines, i.e., linecards 204, 206, TTS 202, and FAX input/output ports 208, are connected together such that a single telephone line 210 may access both systems. In the depicted preferred embodiment, the computer database accessing means is a text message system 100 accessing a host computer 108 resident electronic mail system. Alternatively, the user, in addition to accessing electronic mail, can access specific database information that is stored in a text format. Additionally, the host computer system 108 does not have to be maintained as an external unit, but can be integrated into the text message system 100.

Figure 3:
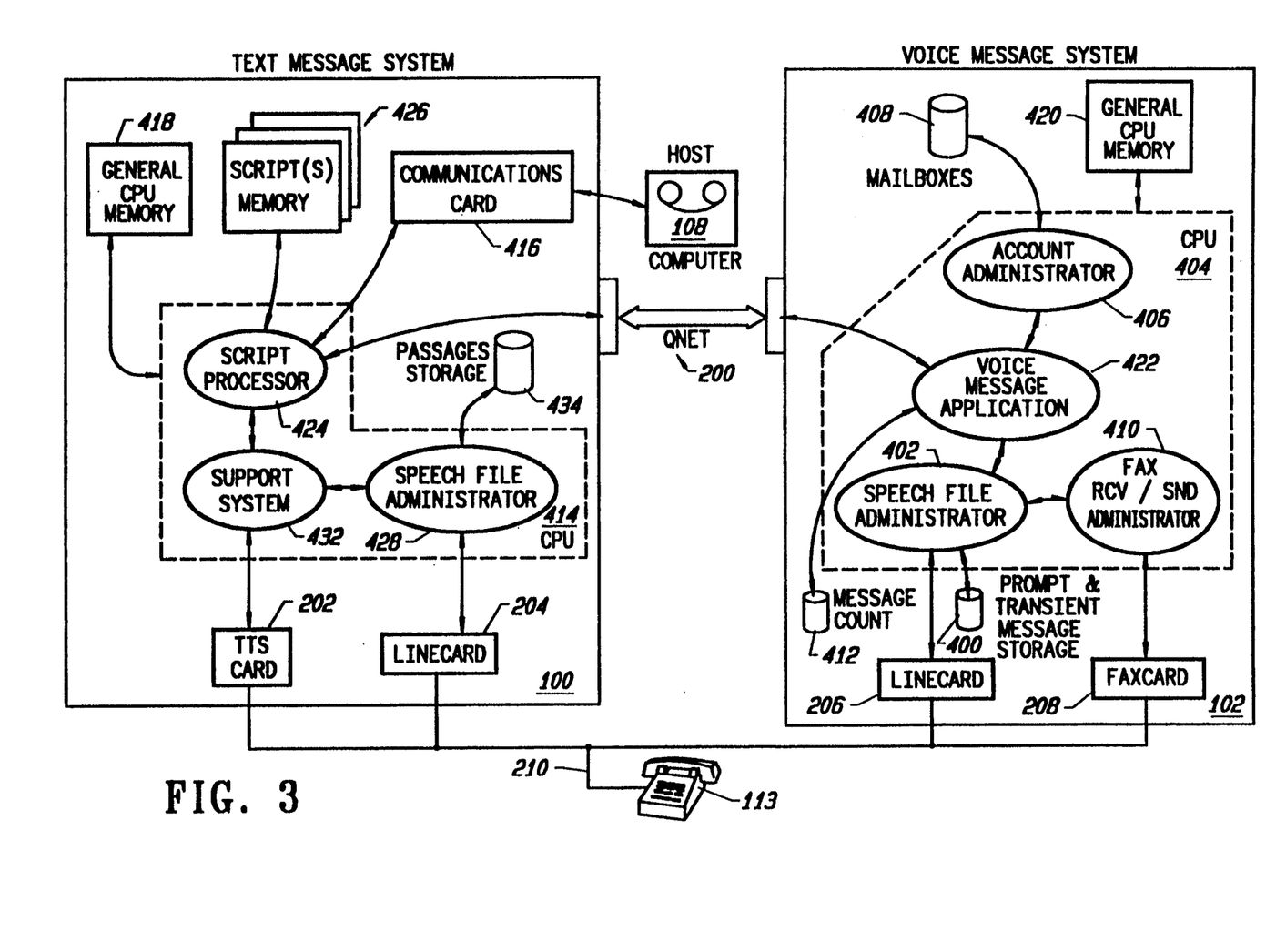
FIG. 3 is a detailed block diagram of the invention depicted in FIG. 1.

FIG. 3 depicts in block diagram form the internal structure of the text message system 100 and the voice message system 102 as well as the local area network 200 which bridges between the two systems. These block diagrams are based upon the VoiceMemo II ™ and Voice Gateway System ® manufactured by Centigram Communications Corporation; however, the use of these systems as the basis for the following discussion should not be construed as limiting the invention to use with only these systems. As will be described, the local area network 200 which coordinates the operation of the systems and creates a comprehensive communications system having both text and voice message manipulation capabilities is applicable with almost any text message system and voice message system having sufficient memory and microprocessors to be host to the local area network software.

In operation, a caller can dial the phone number (or extension number) of a user and be connected to the voice message system 102 via the linecard 206 in the event the user does not answer the telephone. A number of prerecorded prompts and transient messages such as a greeting and instructions on how to reach a receptionist or leave a message are stored in disk memory 400. These are accessed by the speech file administrator 402, a subprogram which is executed by the voice message system microprocessor 404. The prompts are played in a sequence which leads the caller through the process of leaving a message for the user. The account administrator 406, a subprogram executed by the microprocessor 404, places the message in the user's mailbox which corresponds to his or her extension. Typically, the mailboxes are located upon one or more hard disk drives 408, but with advances in technology, it is foreseeable that optical disks or some other mass storage device will be useful for mailbox allocation in the future.

In addition to the voice message, a facsimile may be transmitted by a caller and stored in a mailbox. For instance, the caller may call an extension and be directed to the voice message system 102. The prompt menu will include a prompt which enables the caller to command the system 102, by depressing a specific key on the telephone touchtone keypad, to prepare to receive a facsimile. The caller may leave a voice message as an introduction and then send the FAX to the desired mailbox. The FAXcard 208 receives the facsimile data and the FAX RCV/SND administrator 410, a subprogram executed by the microprocessor 404, tags the digital image file which represents the facsimile as a speech file to be stored in a mailbox location on the disk drive 408. The file is stored in digital format at the user's mailbox address rather than automatically printing a hard copy as is done by most office FAX systems.

Since the operation of electronic mail systems is old in the art, their operation will only be briefly reviewed. The host computer's electronic mail or E-mail system receives messages from senders, the functional equivalent to a caller in the voice mail system operation. Typically, the senders utilize personal computers (PC) or terminals which are connected directly to the host computer or via a local area network (LAN). Each sender has a unique local address usually designated by a unique character string to identify the PC or terminal as well as a character string representing the host computer. This enables senders using other computers in other networks to connect to remote hosts via a modem and address messages to users on many networks other than the sender's own network.

The sender's text messages are stored on a hard disk associated with the host computer of the user to whom the message is addressed. Typically, the user may receive the message by connecting to the host computer and retrieving the text message via a computer or terminal. In addition, the network host computer may include communal databases which users may access with their terminals or PCs to update data stored therein.

In accordance with the preferred embodiment of the invention, to retrieve any of the messages recorded by senders or callers, a user makes a single telephone call via a touchtone telephone 113. In the preferred embodiment, the call is initially handled by the voice message system 102 via linecard 206. However, in the alternative, the call can be handled initially by the text message system 100 via linecard 204 and the following description of the master-slave arrangement would function with the voice message system 102 being the master and the text message system 100 being the slave. Thus, voice and FAX messages may be manipulated as before without interaction with the text message system 100 via the network 200. However, the network 200 is constantly utilized to update the message counter 412 in the voice message system 102 with the number of text messages which are stored and the number that have not been previously read. Thus, the text message system 100 constantly monitors the electronic mail system on the host computer 108 for message activity. When a message is added, read, or deleted an updated count is sent via the network 200 to the voice message system message count memory 412 corresponding to the user's address where the change occurred.

Figure 4:
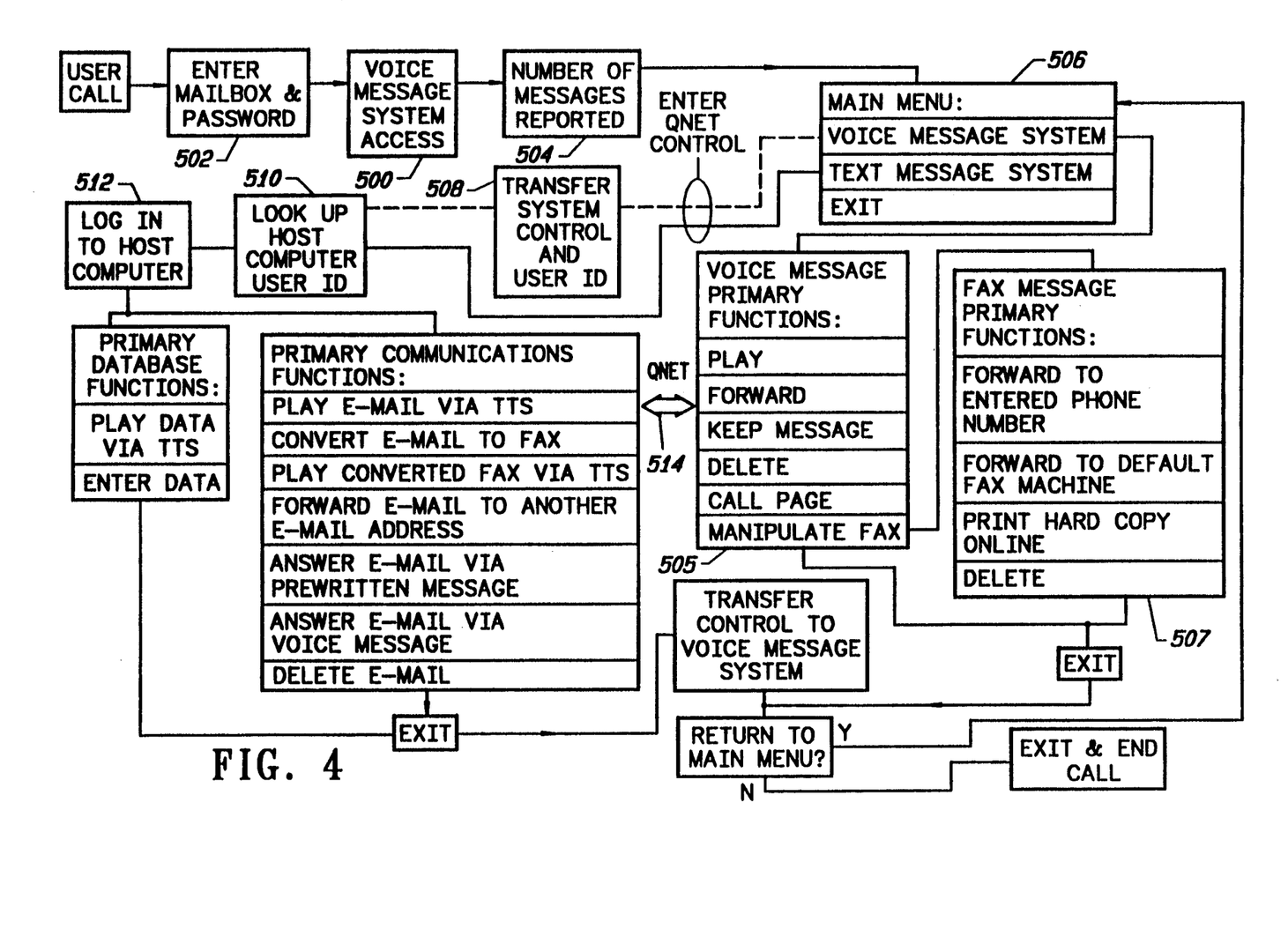
FIG. 4 is a functional block diagram depicting the operation of the preferred embodiment of the invention.

Referring to FIG. 4, after the user has logged into the voice message system 500 by entering their voice mailbox number and password 502, the voice message system 102 informs the user of the number of text, voice, or FAX messages 504 which are stored and how many have not been played previously. The prompt menu 506 enables the user to connect to the text message system 100 by depressing a single touchtone key or remain within the voice message system 102 to manipulate voice messages and facsimile messages as described previously. Boxes 505 and 507 shown in FIG. 4 list the primary functions of the voice message system 102.

Figure 5:
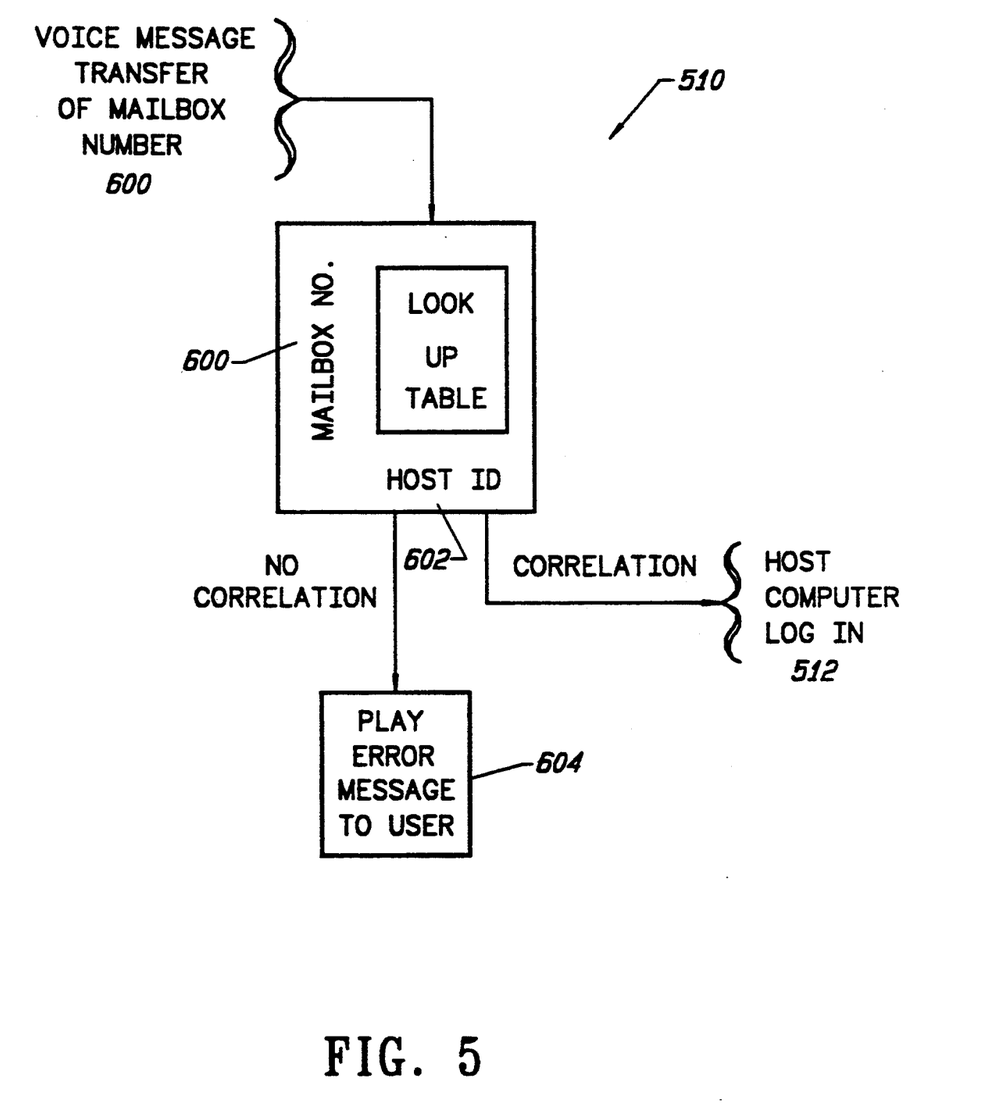
FIG. 5 is a functional block diagram showing the process by which a voice message system mailbox number is correlated with the host computer user identification to facilitate automatic login to the host computer.

Upon depression of the special key, e.g., the "#" key, communications system control is passed to the microprocessor or microprocessors 414 in the text message system 100 via the network, step 508. Alternatively, the system can be configured such that control is passed automatically, without user action, upon call connection to the voice message system 102. In addition to passing control, the voice message system passes the user's mailbox number and password to the text message system. Subsequently, the text message system uses a cross reference table 510 as shown in FIG. 5 to correlate the voice message mailbox number 600 to a text message system user ID 602. If the correlation is not found, the user is told so via a verbal error message 604. If the ID 602 is found, the text message system 100 will automatically log the user into their electronic mail account on the host computer 108, step 512, via the communications card 416. If the user has more than one electronic mail account on the same host or different hosts, the text message system 100 will request that the user depress a special key combination to access the desired host and account. At this point a description of the network operation is necessary.

The network 200 is a commercial software product which provides multi-tasking, multi-user, and local area network (LAN) capabilities entitled QNX Operating System that is produced by Quantum Software Systems Ltd. of Ottawa, Ontario, Canada. QNX resides in the RAM memory 418, 420 of both the text message system 100 and the voice message system 102. QNX is used in this application for its multi-tasking and LAN capabilities which enable QNX to coordinate the various tasks executed on each of the message systems via an ARCNET local area network link between the systems in such a way that a substantially seamless, integrated text and voice communication system is created.

In accordance with one aspect of the invention, control of the integrated system is passed from the microprocessor(s) 404 in the voice message system 102 to the microprocessor(s) 414 in the text message system 100. Thus, a master-slave relationship is established via the network operating through the ARCNET LAN link between the systems. More specifically, the main voice message application program 422 enters a slave mode, ready to execute any commands sent to it via the ARCNET LAN connection. The commands are issued by the text message system microprocessor(s) 414 as the text message system 100 becomes the master entity controlling call processing. Typically, the first command issued is a request for the voice message system 102 to send the user's voice mailbox number to the text message system 100.

Subsequent to the initialization of the master-slave relationship, the script processor program 424 becomes the main application program within the text message system 100. The QNX network or QNET function establishes a control system to execute functional tasks in either of the message systems in a coordinated fashion. In other words, tasks which are programmed to be executed by the operating systems of the individual message passing operating systems, e.g., UNIX, are executed by QNET in an administrative role.

To implement the QNET coordinating function, each of the basic tasks accomplished by the text and voice message systems 100, 102 is assigned a unique task identification number. The task ID is assigned by the QNX Operating System using its "clearing house" feature. Upon system initialization, each task is published by name within the "clearing house" and is assigned a task ID. If either system does not know the task ID of a task it desires to execute, it goes to the clearing house and uses the task name to find the task ID used to execute the task. Once this process is completed for an individual task, the requesting system remembers the task ID number and does not use the clearing house on subsequent executions.

A script or scripts 426 are executed by the script processor 424 in the text message system 100 to control the step by step process of retrieving and playing text messages or interacting with a database as the user requests such activity via the touchtone keypad. The scripts 426 may be uniquely tailored for a specific user or set of users. For instance, a user or group of users who never use the sales database would have a script assigned to their user IDs which does not provide them the prompt option of accessing the sales database.

As discussed above in reference to FIG. 4, QNX operating system control is initiated upon special command of the user at the main menu 506. Thereafter, functions of both message systems can be executed in any order via QNET as indicated by arrows 514 in FIG. 4. The functions or tasks listed in FIG. 4 are meant to be exemplary and should not be construed as limiting the invention in any manner.

Figure 6:
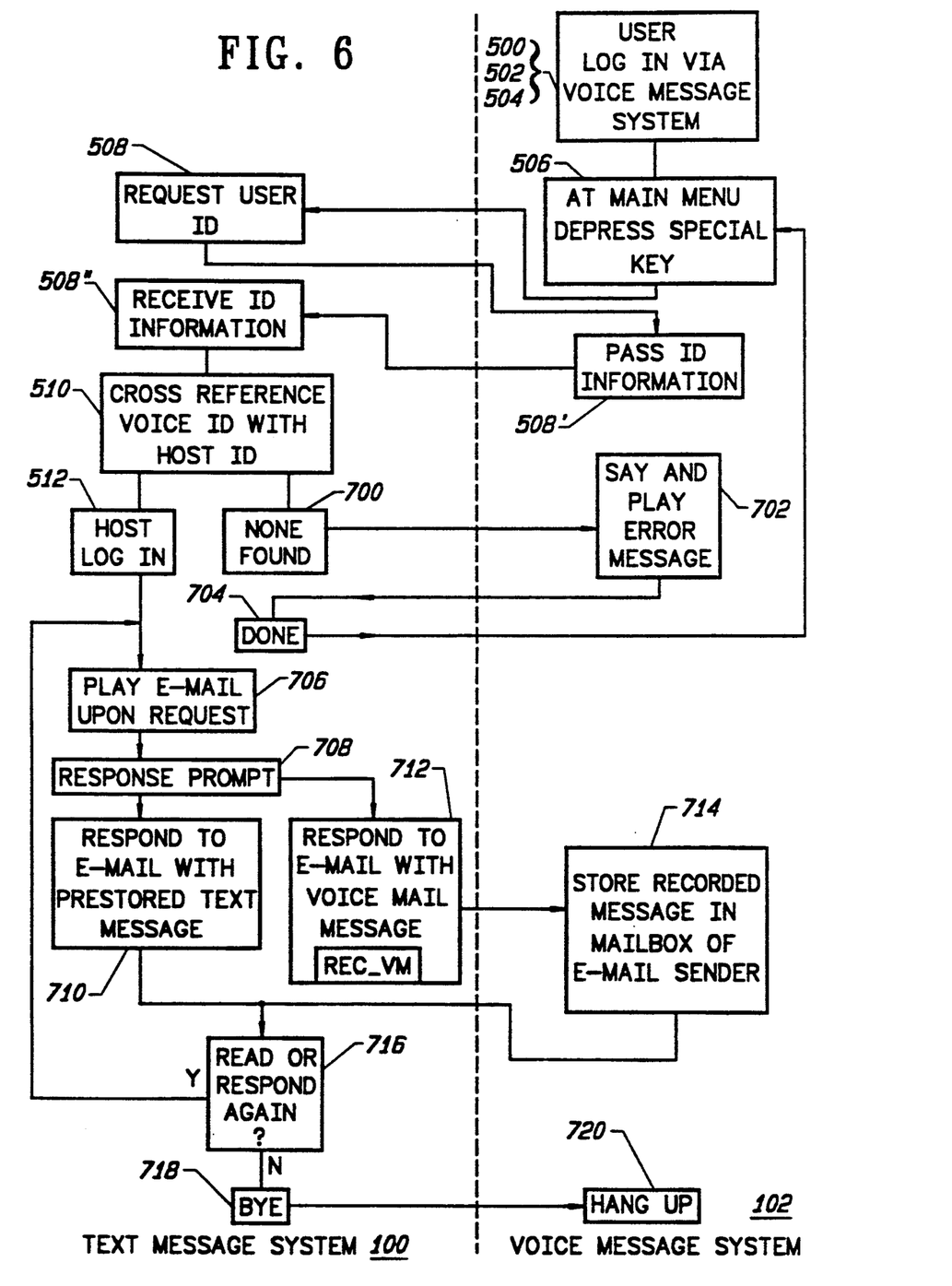
FIG. 6 is a flow chart of the process by which electronic mail messages are received and answered using the invention.

FIG. 6 depicts the process of playing an electronic mail text message and responding to the message via both a pre-stored written message(s) and a voice message to the electronic mail sender's voice mailbox. User login and transfer of control is accomplished as discussed above in connection with FIG. 4, steps 500, 502, 504, 506, 508, and 510. Note that if the look up table does not find a proper user ID for the host computer 700, a SAY command will be sent to the voice message system to preload an error message in the telephone linecard common memory and a PLAY command will play the error message to the user 702. When the message is complete the system operation continues in the text message system at step 704. The DONE command, executed automatically, releases control of the system from QNET and returns the user to voice message system control in the same logical step where the user pressed the digit for text message system access within the main menu 506.

If the proper ID is returned, host login is accomplished at step 512. If there is more than one text message, the user may choose which electronic mail text message to be played. In operation and referring to FIG. 3, the speech file administrator 428 retrieves and plays the stored prompts 430 as commanded by the support system algorithm 432. The support system 432 coordinates the TTS card 202 operation with the prompt operation to choose text messages to be played. As the prompts are played, the user interacts with the system 100 via either linecard 204 or 206. The linecards interpret user touchtone commands and are capable of dialing out going calls at the user's request. The task management operation of the network 200 controls which linecard is used for user interaction during each task execution. The TTS card 202 will read each E-mail message as requested, step 706 in FIG. 6.

Afterward, the system 100 will prompt the user about the mode of response 708. The user may request that one of the pre-stored text responses stored on disk memory 434 be sent via electronic mail to the address of the sender 710. Choice of the response is menu driven. However, if the user desires to respond to the sender via a voice message 712, QNET will initiate the voice message recording task (REC_VM) in the voice message system 714. The voice mailbox of the sender is determined via the correlation table, FIG. 5, and the voice message system connects the user automatically to the proper mailbox. Once the message been recorded and saved in the recipients voice mailbox, QNET returns to the text message system and requests whether the user wishes to read another message 716. If not, the user is finished and hangs up the receiver. This act initiates the BYE command which returns control to the voice message system 718 and initiates the HANG UP task 720. From here, the voice message system awaits the next call.

Figure 7:
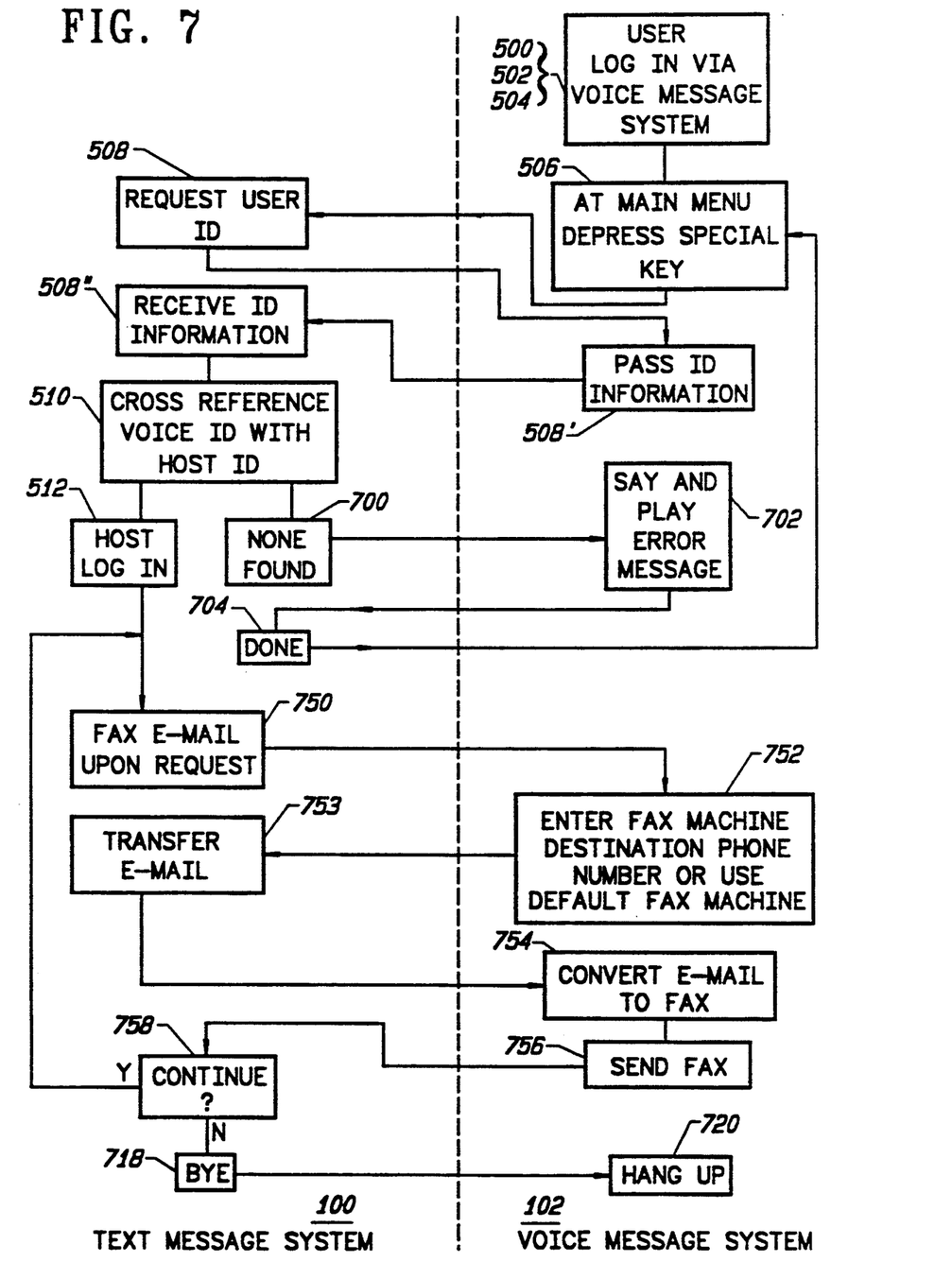
FIG. 7 is a flow chart of the process by which an electronic mail message is forwarded as a facsimile transmission using the invention.

FIG. 7 depicts the process of forwarding an electronic mail message to a FAX transceiver. The process is essentially identical to that which is shown in FIG. 6 through to step 512. After login to the host computer is accomplished, the user, through a menu driven process through the telephone, selects an electronic mail message and indicates to the system the desire to forward that message via facsimile transmission, step 750. Note that the voice message system contains the FAX card; therefore, all facsimile transceiving functions are conducted through that system. The voice message system requests from the user the telephone number to which the FAX is to be sent or whether the default FAX machine should be used, step 752. The electronic mail message is transferred from the text message system to the voice message system 753 and converted from a text format into a facsimile format 754. Finally, the voice message system connects via the phone system to the desired FAX machine and sends the facsimile at step 756. Upon accomplishing the transmission the process continues within the text message system. The user may continue text message manipulation 758, i.e., read mail, FAX other messages, etc., or hangup, steps 718, 720.

Table 1 summarizes the tasks which the text message system may request the voice message system to accomplish.

TABLE 1

SYNCHRONIZATION TASKS
    GET_USER - retrieves mailbox number of user
    GET_RECIPIENT - retrieves mailbox number of voice message recipient
    DONE - return control to voice message system without exit
    BYE - summarize mailbox contents to user and exit
LINE CONTROL TASKS
    ANSWER - go off hook
    HANGUP - go on hook
    WAIT_FOR_RINGING - Wait for an incoming call
    MAKE_CALL - outdial
CALLER OUTPUT
    GET_INPUT - retrieve caller DTMF digits
    FLUSH - flush out any pending DTMF digits
SPEECH OUTPUT
    SAY - preload a voice message prompt or message
    SAY_NUM - say a number up to 6 digits long
    SAY_EXT - say an 11 digit mailbox number
    SAY_DATE - say date/time (long format)
    SAY_ASCII DATE - say date/time (ASCII format)
    PLAY_NAME - say the name from a mailbox
    PLAY - output preloaded speech
RECORD TASKS
    RECORD - record a message
    REC_VM - record a message to a mailbox from user
    REC_OUT - record a message to a mailbox
    APPEND - append a message
CUSTOM
    GET_DATE - retrieve a date/time
FAX
    SND_FAX - send a fax from a text file using voice TABLE 1-continued message system faxcard
    RCV_FAX - receive a fax via voice message system faxcard The foregoing table of tasks should not be considered to limit the invention in any manner. The tasks which the text message system can request the voice message system to accomplish can encompass any task the voice memo system can accomplish independently.

Figure 8:
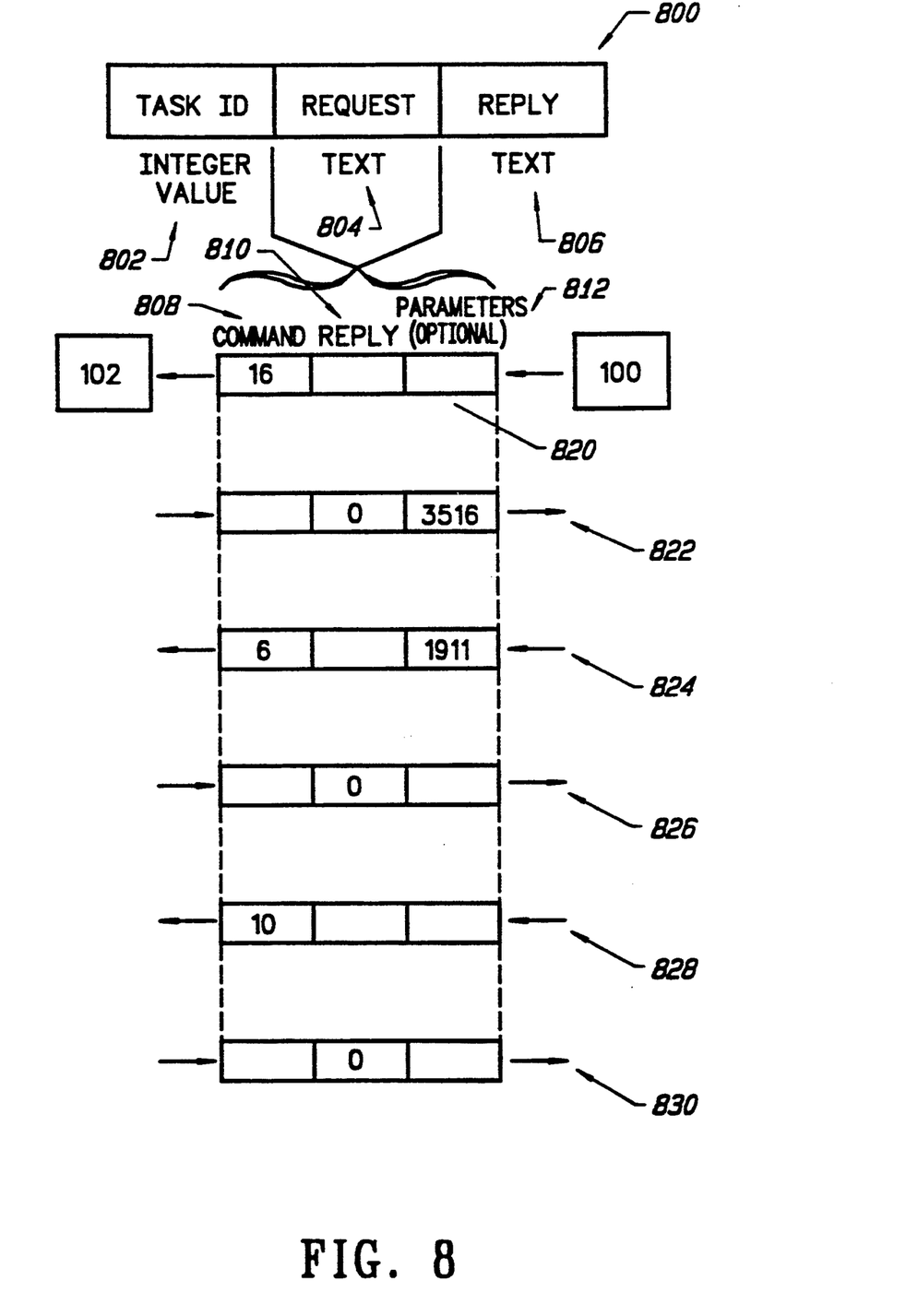
FIG. 8 depicts the network message format.

FIG. 8 depicts the high level message structure 800 of a task command sent by a typical QNX task during system operation. This structure 800 contains the task identification number (TID) 802 of the destination program, the contents of the request 804 and a reply field 806. In essence this structure 800 operates as an envelope specifying the destination routine address as a TID 802 and including a specific task request within the request field 804 as the envelope contents. The TID 802 is the address of the main routine capable of executing the specific request contained in the request field 804. The reply field 806 carries text indicative of whether the message was received or not by the destination task associated with the TID address.

The communication protocol between the voice message system 102 and the text message system 100 is such that the request field 804 is loaded with ASCII text numbers relating to the types of requests as shown in FIG. 8 as reference numerals 822 through 830. For example, a "16" in the command field 808 requests the execution of the GET_USER task. The subsequent reply from the voice message system, also packaged in the envelope form shown at 800, will contain in the general reply field 806 a message indicating that the task was received by the proper routine. Within the request field 804 of the envelope of is the specific reply message 810 shown at 822. Therein is replied the ASCII character "0" indicating the task was executed, followed by a set of parameters 812 containing the requested information. In this instance, mailbox number 3516.

However, if the mailbox number was not found the parameter field 812 would contain an "3" indicating an error. An appropriate error message would then be played to the user. Envelopes 824, 826, 828, and 830 depict the message structures for playing a particular message. Once the text message system 100 has been informed of the error, it requests the voice message system 102 to load a specific prerecorded error message. Command "6" is the SAY command and the parameter field contains 1911 which indicates the appropriate message to be played, e.g., "mailbox not found." The voice message system replies with "0", indicating that the message has been loaded. Subsequently the PLAY command is requested by the text message system indicated by command number "10" and after playing the previously loaded message the voice message system replies with "0".

Figure 9:
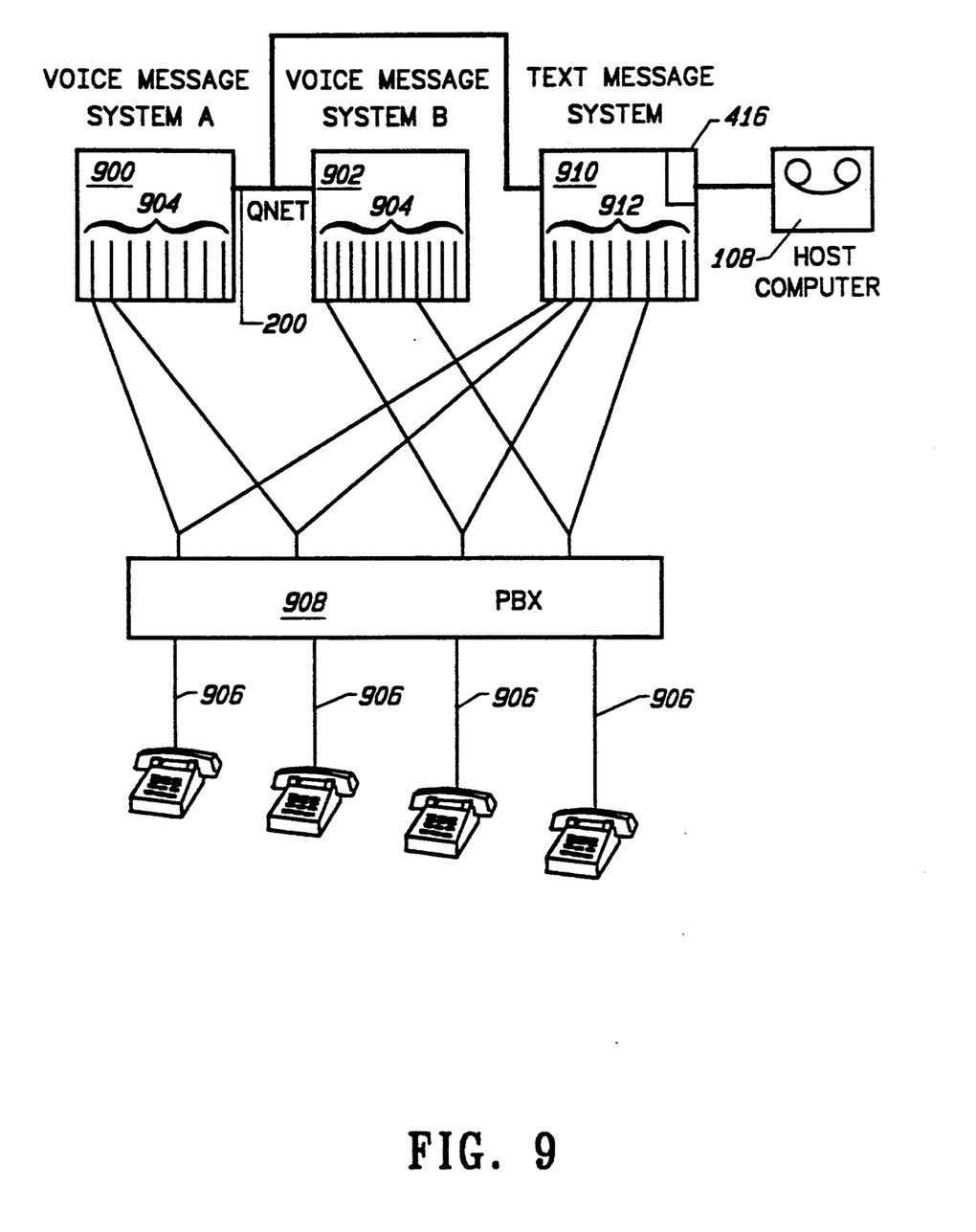
FIG. 9 is a block diagram of the invention incorporated into a practical, multi-user system.

The foregoing discussion focused upon the operation of the invention with respect to a single caller and a single user; however, as a practical matter, a plurality of telephone lines and/or a PBX connected to a telephone trunk line are necessary for the creation of a fully functional system. FIG. 9 depicts such a system in block diagram form. Therein, two voice message systems 900, 902 are parallel connected via QNET 200 to expand voice message handling capacity. Each user is allocated both a FAXcard and a linecard shown as a single element 904 for simplicity. The FAX and linecards are connected to individual telephone lines 906 via a PBX 908. Correspondingly, the telephone lines 906 and PBX 908 are connected to the text message system 910 via linecard and TTS card pairs. The multi-tasking function of the QNET 200 enables the depicted comprehensive communication system to handle multiple calls from callers and users at the same time. Functionality of the multi-user system is similar to the operation of the single user system discussed previously.

Figure 10:
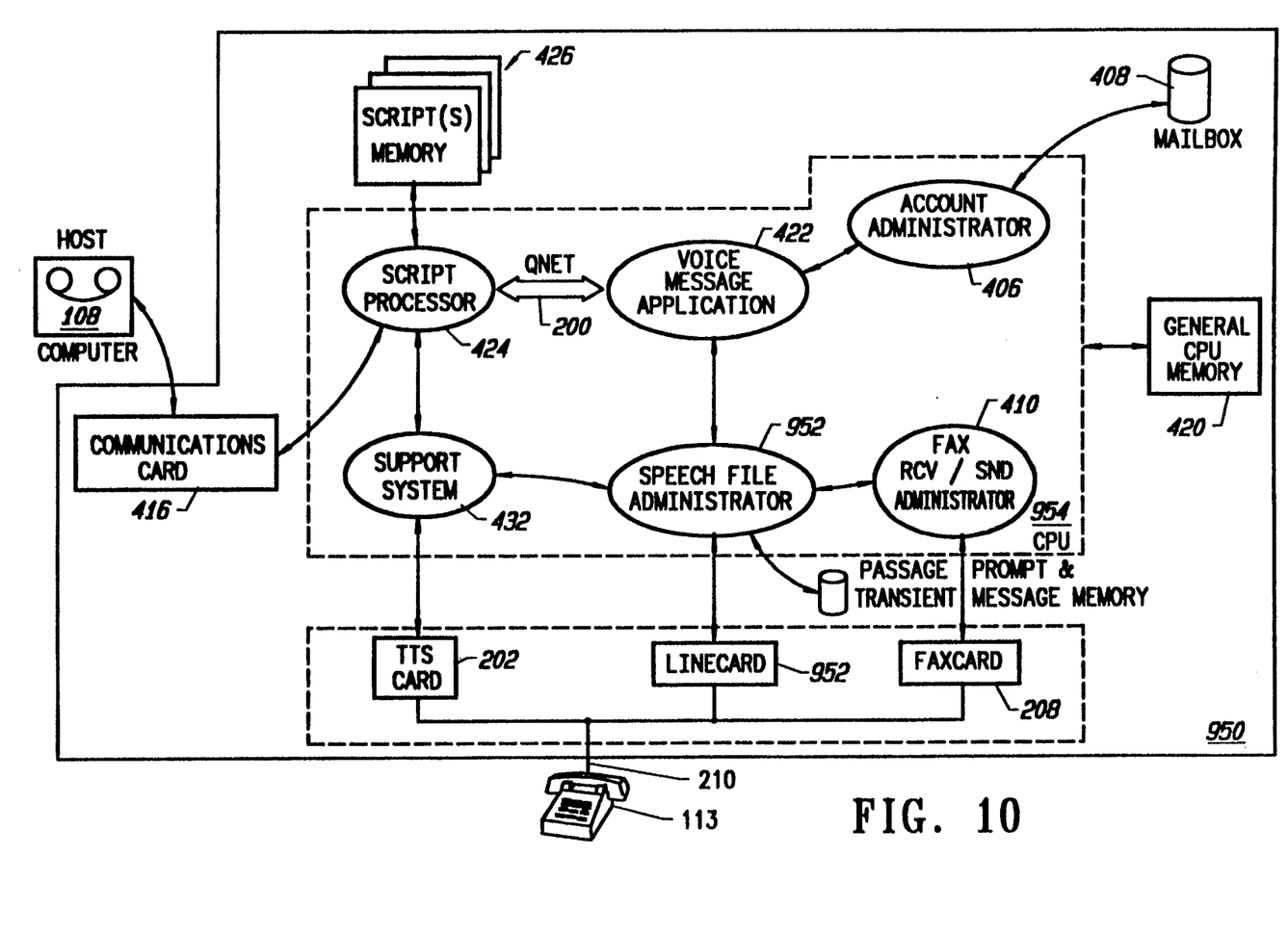
FIG. 10 depicts an alternative embodiment of the invention.

In FIG. 10 is shown an alternative embodiment of the invention. Therein, the voice message and text message systems are integrated into a single system 950 eliminating a number of redundant circuits and software routines. For instance, only a single linecard, FAXcard, and TTS combination circuit 952 is necessary. A combination circuit can be constructed upon a single circuit card using a digital signal processor (DSP) such as the TMS320C31 from Texas Instruments as the central component. In addition, the speech file administrator program 952 function which is accomplished in both systems in the preferred embodiment is accomplished as a single program in this alternative embodiment. Transparently over the network, the operating system maintains the cooperation between the main application programs 424, 422 as it accomplished in the preferred embodiment. The single system 950 operates an identical manner to the dual systems described previously.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A communication system comprising:
   a telephone line;
   a voice message system directly coupled to said telephone line, said voice message system storing and retrieving voice messages, said voice message system including a first transfer mechanism to generate a first transfer command in response to a first instruction;
   a text message system directly coupled to said telephone line, said text message system storing and retrieving text messages, said text message system including a second transfer mechanism to generate a second transfer command in response to a second instruction; and
   a network coupled between said voice message system and said text message system for transferring processing of a call between said voice message system and said text message system in response to said first transfer command and said second transfer command, said first transfer command initiating a first control transfer wherein processing of a call is transferred from said voice message system to said text message system and said second transfer command initiating a second control transfer wherein processing of a call is transferred from said text message system to said voice message system, said first control transfer including the transfer of user identification data to enable access to said text message system.

2. The communication system of claim 1 wherein said network includes
   means for correlating said user identification data with a text message system user identification code; and
   log-in means, utilizing said text message system user identification code, for logging into said text message system.

3. The communication system of claim 1 wherein said voice message system includes apparatus for storing and retrieving facsimile data.

4. The communication system of claim 1 wherein said text message system includes a text-to-speech converter for orally presenting said stored text messages.

5. The communication system of claim 1 wherein said voice message system further includes a first memory and at least one first microprocessor and said text message system includes a second memory and at least one second microprocessor and wherein said network includes an operating system distributively located in both said first and second memories.

6. The communication system of claim 5 wherein said first memory stores a plurality of tasks for controlling said voice message system and said second memory stores a plurality of tasks for controlling said text message system and said network coordinates execution of said tasks.

7. The communication system of claim 6 wherein said at least one second microprocessor controls said at least one first microprocessor operation in a master-slave relationship via said network.

* * * * *